(12) United States Patent
Yeh et al.

(10) Patent No.: US 12,032,165 B2
(45) Date of Patent: Jul. 9, 2024

(54) GLASSES TYPE DISPLAY DEVICE

(71) Applicant: HTC Corporation, Taoyuan (TW)

(72) Inventors: Tung-Hsin Yeh, Taoyuan (TW);
Ching-Ho Li, Taoyuan (TW);
Wei-Cheng Liu, Taoyuan (TW);
Chun-Lung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 341 days.

(21) Appl. No.: 17/351,257

(22) Filed: Jun. 18, 2021

(65) Prior Publication Data

US 2022/0075192 A1    Mar. 10, 2022

Related U.S. Application Data

(60) Provisional application No. 63/075,213, filed on Sep. 7, 2020.

(51) Int. Cl.
*G02B 27/01* (2006.01)
*G02C 5/14* (2006.01)
*G02C 5/22* (2006.01)

(52) U.S. Cl.
CPC ..... *G02B 27/0172* (2013.01); *G02B 27/0176* (2013.01); *G02C 5/14* (2013.01); *G02C 5/22* (2013.01); *G02B 2027/0138* (2013.01); *G02B 2027/0178* (2013.01)

(58) Field of Classification Search
CPC ............ G02B 27/0172; G02B 27/0176; G02B 2027/0138; G02B 2027/0178; G02C 5/14; G02C 5/22; G02C 5/146; G02C 5/10; G02C 5/2272; G02C 5/2227; G02C 5/122; G02C 5/2281; G02C 5/229; G02C 9/02
See application file for complete search history.

(56) References Cited

U.S. PATENT DOCUMENTS

| | | | |
|---|---|---|---|
| 2016/0246059 A1* | 8/2016 | Halpin | G02B 27/0176 |
| 2017/0061647 A1* | 3/2017 | Starner | G06V 40/67 |
| 2017/0090212 A1* | 3/2017 | Rinehart | G02C 5/20 |
| 2017/0102549 A1* | 4/2017 | Lee | G02B 27/0176 |
| 2017/0108918 A1* | 4/2017 | Boesen | H04R 1/1016 |
| 2018/0014105 A1 | 1/2018 | Abreu | |

FOREIGN PATENT DOCUMENTS

| | | |
|---|---|---|
| CN | 209446887 | 9/2019 |
| CN | 211180445 | 8/2020 |
| CN | 111665636 | 9/2020 |

(Continued)

OTHER PUBLICATIONS

"Office Action of Taiwan Counterpart Application", issued on Nov. 14, 2022, p. 1-p. 6.

(Continued)

*Primary Examiner* — Joseph P Martinez
*Assistant Examiner* — Ray Alexander Dean
(74) *Attorney, Agent, or Firm* — JCIPRNET

(57) ABSTRACT

A glasses type display device including a front end assembly and a pair of legs is provided. Each of the pair of legs includes a front segment, a rear segment, a torsion mechanism, and a rotation mechanism. The torsion mechanism is disposed between the front end assembly and the front segment. The rotation mechanism is disposed between the front segment and the rear segment.

7 Claims, 8 Drawing Sheets

(56) References Cited

FOREIGN PATENT DOCUMENTS

| CN | 211402937 | 9/2020 | |
|----|-----------|--------|---|
| CN | 213023775 | 4/2021 | |
| EP | 3009874 | 4/2016 | |
| EP | 3486709 | 5/2019 | |
| TW | 201227048 | 7/2012 | |
| WO | WO-02069017 A1 * | 9/2002 | ......... G02B 27/0172 |
| WO | 2020164446 | 8/2020 | |

OTHER PUBLICATIONS

"Office Action of Taiwan Counterpart Application", issued on Jul. 5, 2022, p. 1-p. 6.
"Office Action of China Counterpart Application", issued on Mar. 13, 2024, p. 1-p. 7.

* cited by examiner

GLASSES TYPE DISPLAY DEVICE

CROSS-REFERENCE TO RELATED APPLICATION

This application claims the priority benefit of U.S. provisional application Ser. No. 63/075,213, filed on Sep. 7, 2020. The entirety of the above-mentioned patent application is hereby incorporated by reference herein and made a part of this specification.

BACKGROUND

Technical Field

This application relates to a display device, and in particular to a glasses type display device.

Description of Related Art

Currently, a common type of display device used for virtual reality is a head-mounted display device. However, head-mounted display devices are heavy and a wearing process thereof is relatively inconvenient. Therefore, the direction of development of the display device used for virtual reality is driven towards a display device that is light and easy to wear, and a glasses type display device is one of the directions of development.

SUMMARY

This application provides a glasses type display device, in which legs are foldable and have a gripping function.

A glasses type display device of this application includes a front end assembly and a pair of legs. Each of the pair of legs includes a front segment, a rear segment, a torsion mechanism, and a rotation mechanism. The torsion mechanism is disposed between the front end assembly and the front segment. The rotation mechanism is disposed between the front segment and the rear segment.

Based on the above, in this application, via the torsion mechanism disposed between the front end assembly and the front segment, the pair of legs grips the user's head relative to the front end assembly, so that the front end assembly is stably positioned on the user's face. In addition, via the rotation mechanism disposed at the front segment and rear segment of the legs, the pair of legs is folded behind the front end assembly, so that the glasses type display device occupies a small space as a whole.

DESCRIPTION OF THE EMBODIMENTS

Figure 1:
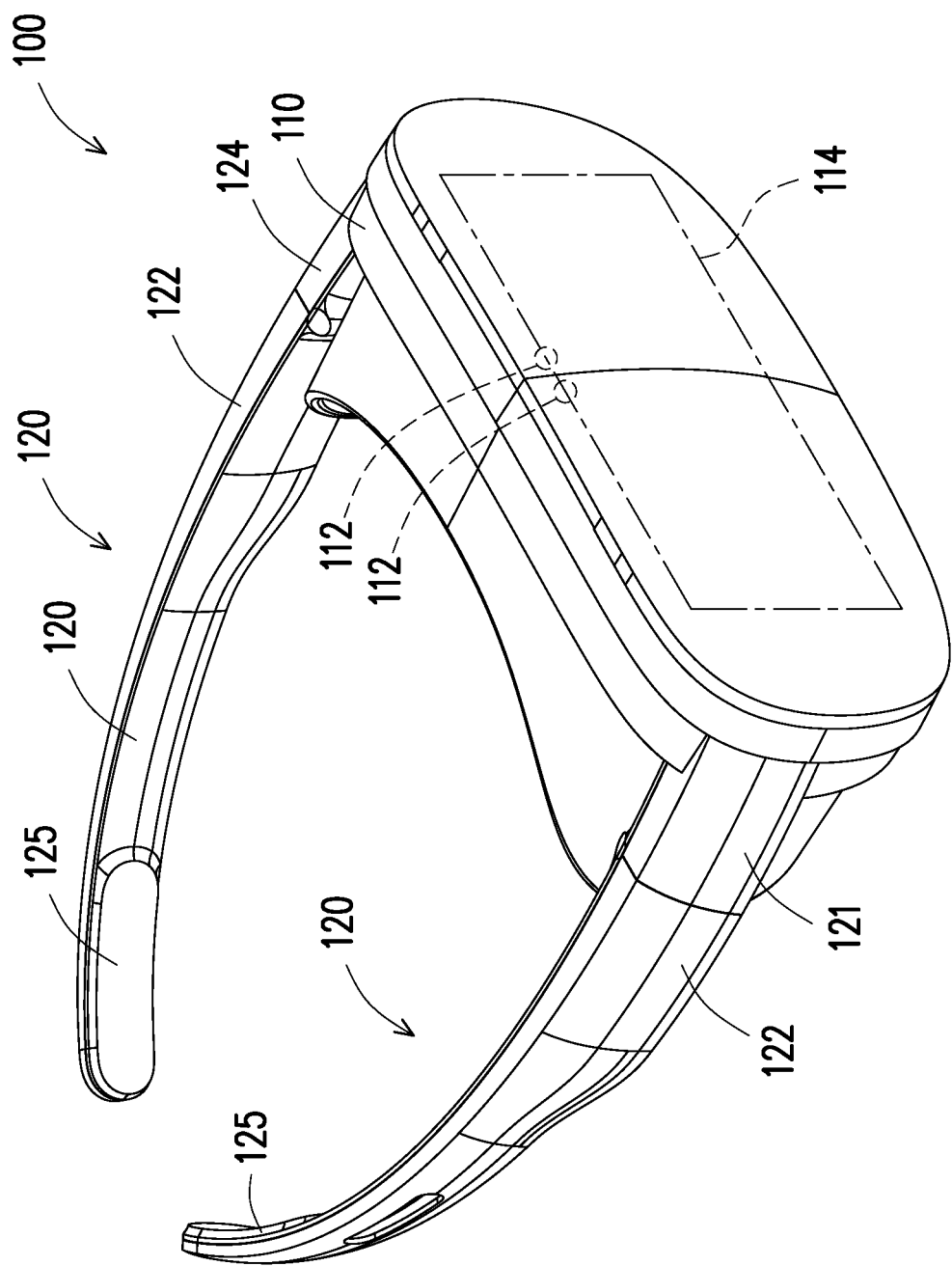
FIG. 1 is a schematic view of a glasses type display device according to an embodiment of the invention.
Figure 2:
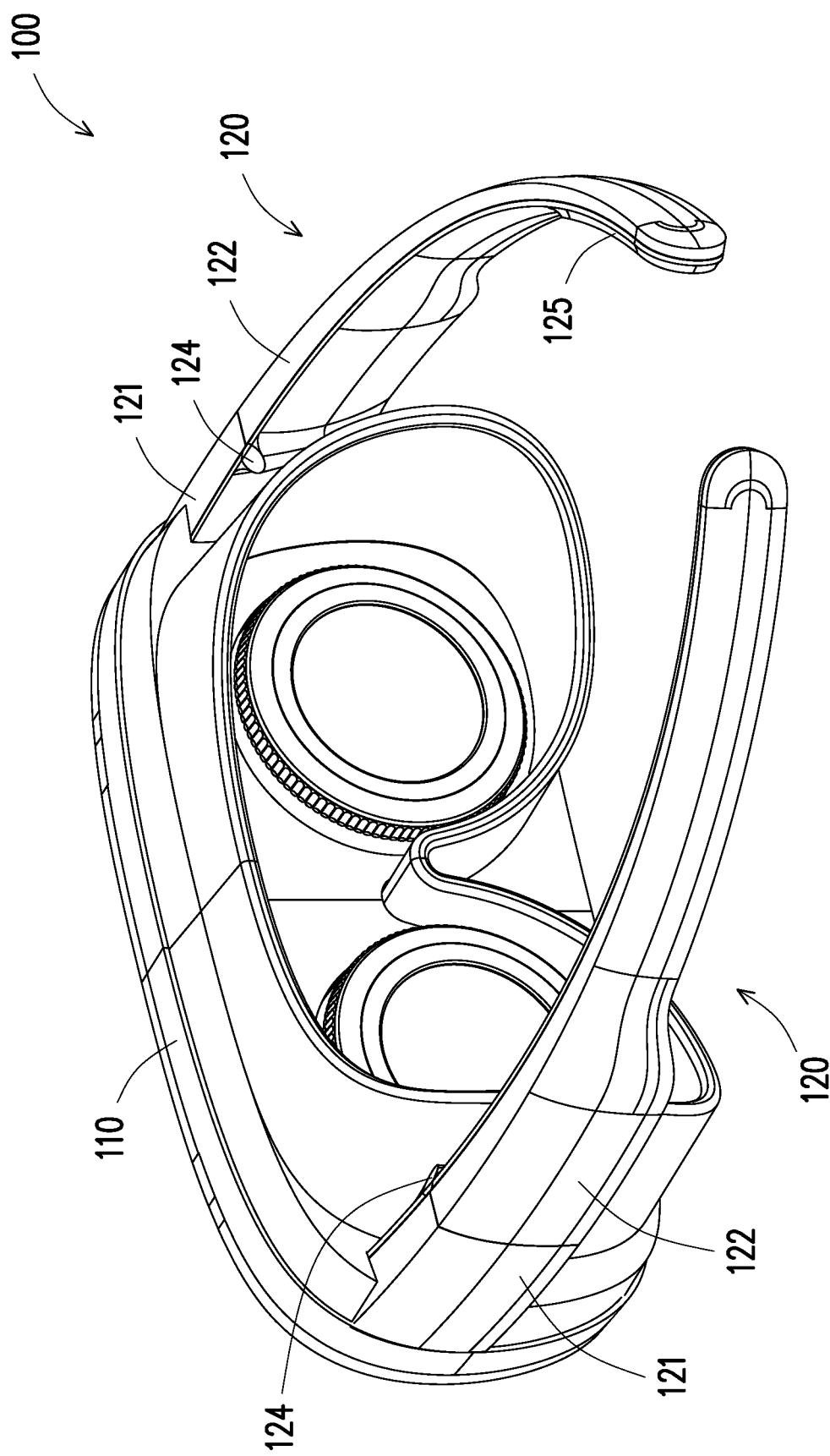
FIG. 2 is a schematic view of the glasses type display device of FIG. 1 from another angle of view.

Referring to FIGS. 1 and 2, in an embodiment of the disclosure, a glasses type display device 100 includes a front end assembly 110. The front end assembly 110 may include an optical system (not shown) and a protection component such as a case, and may be disposed with a display or be adapted for placing a display. The aforementioned display may be an in-built display or an external portable display (such as a smartphone), but this application is not limited thereto. The type of the aforementioned display may be adjusted according to an application of the glasses type display device 100 in a virtual reality system, an augmented reality system, or a mixed reality system. The optical system includes an optical element used to change an optical path of the display, such as a lens, a light guide, or a prism.

Figure 3:
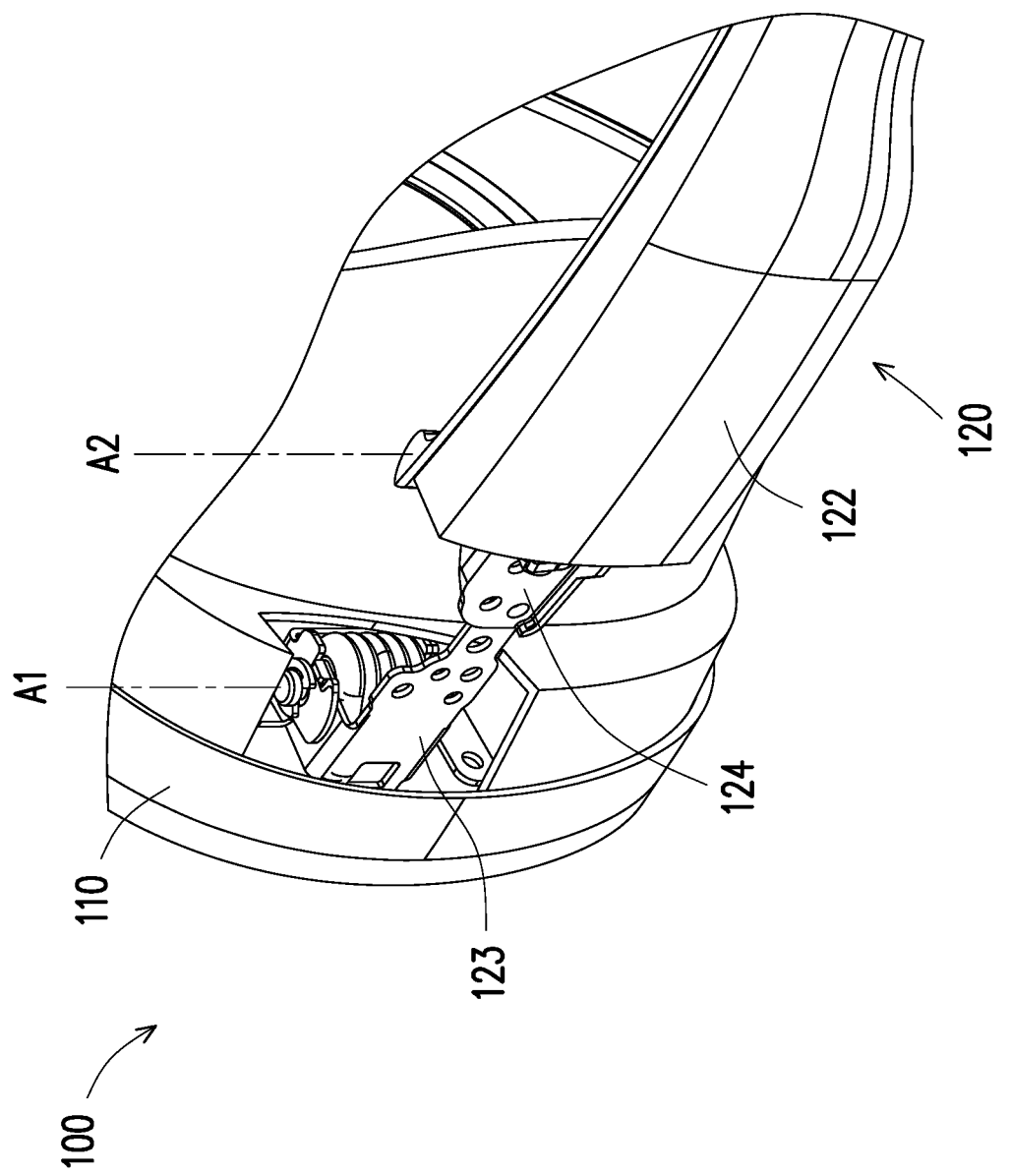
FIG. 3 is a schematic view of a portion of a front segment of the glasses type display device of FIG. 2 with one leg omitted.

Referring to FIGS. 2 and 3, the glasses type display device 100 includes a pair of legs 120. Each leg 120 includes a front segment 121, a rear segment 122, a torque mechanism 123, and a rotation mechanism 124. The torsion mechanism 123 is disposed between the front end assembly 110 and the front segment 121. The rotation mechanism 124 is disposed between the front segment 121 and the rear segment 122.

Figure 4:
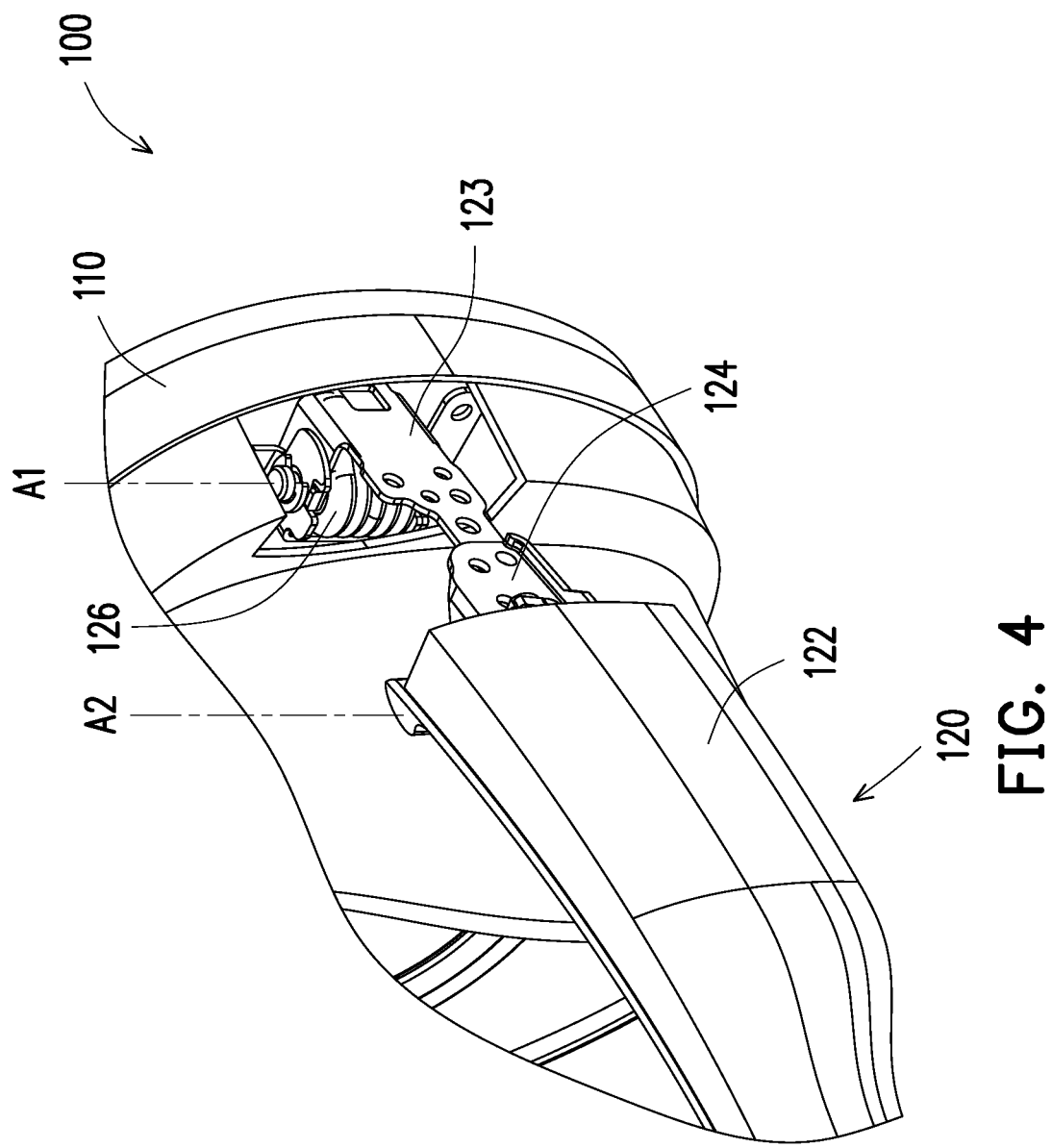
FIG. 4 is a schematic view of a portion of the front segment of the glasses type display device of FIG. 2 with another leg omitted.
Figure 5:
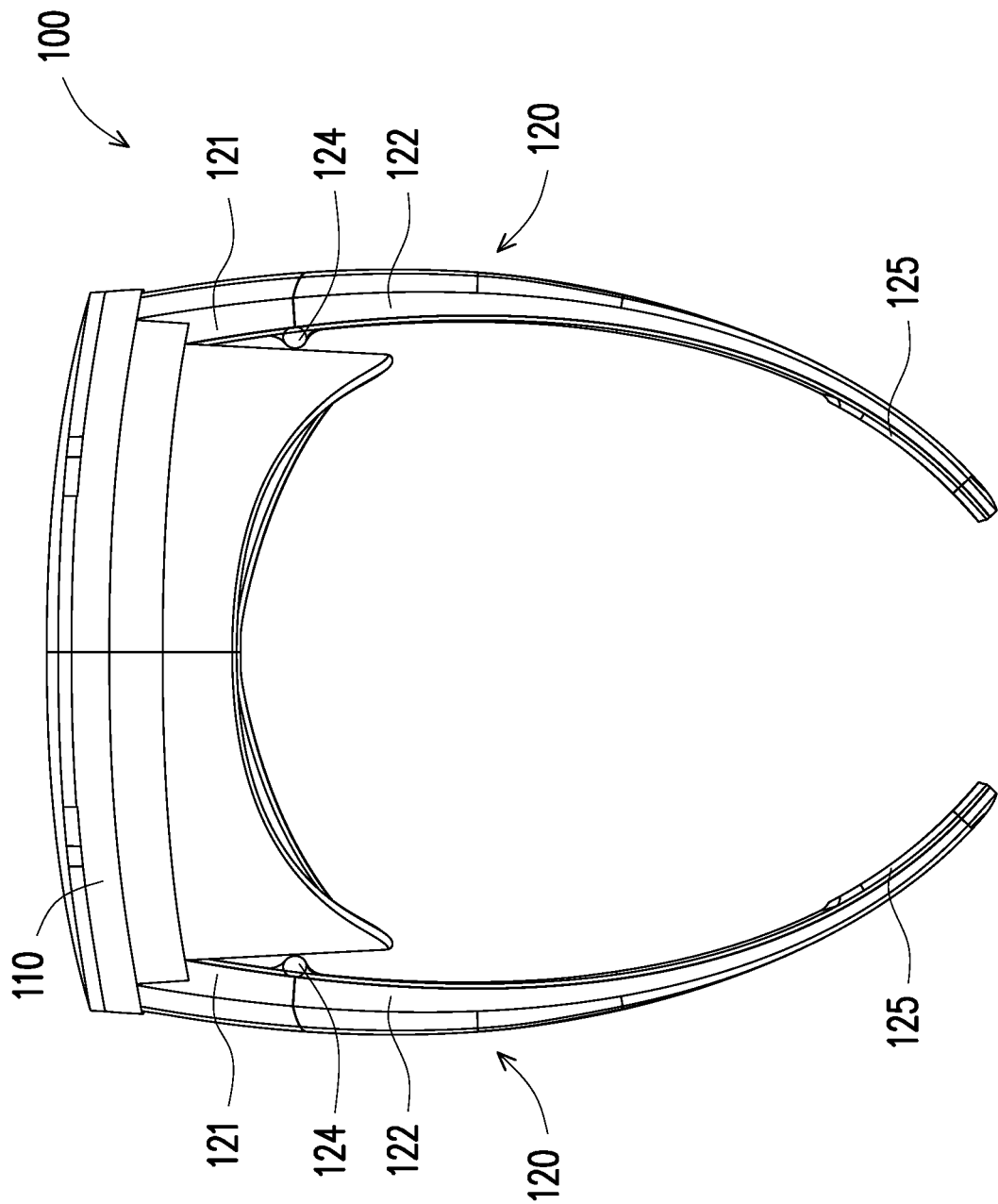
FIG. 5 is a schematic view of the glasses type display device of FIG. 2 when legs are unfolded.

Referring to FIGS. 4 and 5, in this embodiment, the front segment 121 may be slightly rotated relative to the front end assembly 110 via the torsion mechanism 123. The torsion mechanism 123 may apply torque to the front segment 121 of the leg 120 relative to the front end assembly 110. The torsion mechanism 123 is a spring hinge, the spring hinge comprises a spring 126, and the spring 126 is hidden in the front end assembly 110. In this embodiment, the torsion mechanism 123 may be a torsion hinge. Therefore, when a user wears the glasses type display device 100, the torsion mechanism 123 provides torque to the front segment 121 and the corresponding rear segment 122 relative to the front end assembly 110, so that the pair of legs 120 grips the user's head to position the front end assembly 110 on the user's face. In other words, the torsion mechanism 123 may provide sufficient gripping force for users with different head sizes.

Figure 6:
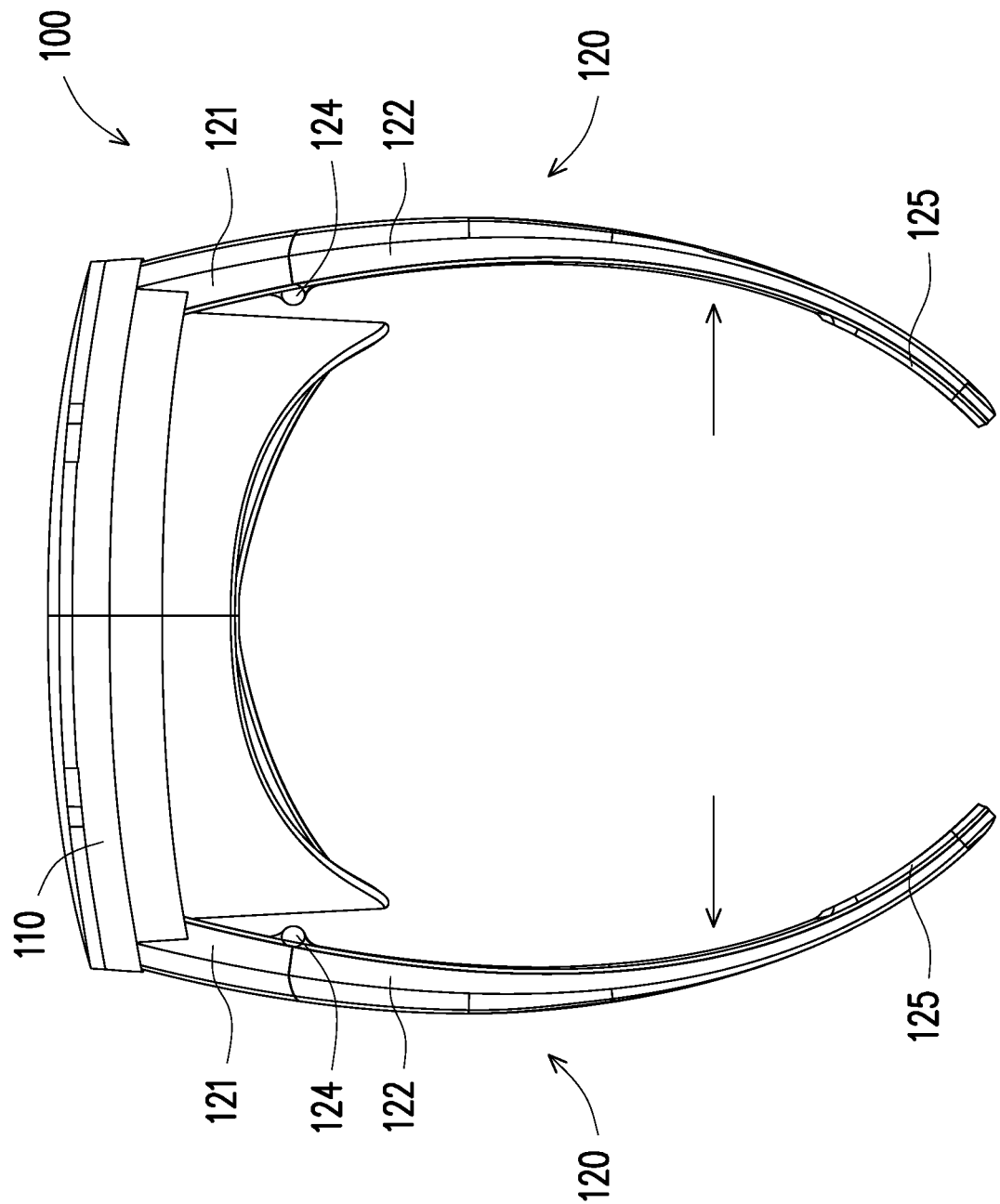
FIG. 6 is a schematic view of the glasses type display device of FIG. 5 when the legs are extended.
Figure 7:
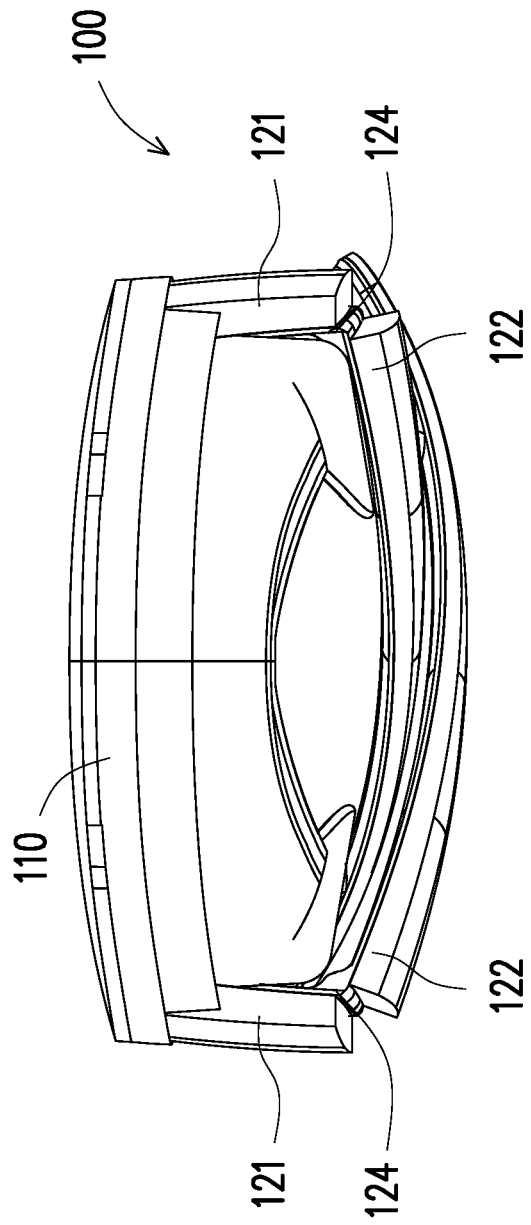
FIG. 7 is a schematic view of the glasses type display device of FIG. 5 when the legs are folded.

Referring to FIGS. 4 and 6, in this embodiment, the rear segment 122 may be significantly rotated relative to the corresponding front segment 121 via the rotation mechanism 124. Therefore, when the glasses type display device 100 is not in use, via the rotation mechanism 124, the corresponding rear segment 122 may be rotated relative to the corresponding front segment 121 to move closer to the front end assembly 110, so that the glasses type display device 100 occupies a smaller space as a whole, which facilitates storage of the glasses type display device 100. In this embodiment, the rotation mechanism 124 may be a hinge. In this embodiment, a rotation axis A1 of the torsion mechanism 123 and a rotation axis A2 of the rotation mechanism 124 may be parallel to each other.

Referring to FIGS. 3, 4 and 5, in this embodiment, the front segment 121 is connected to the torsion mechanism 123, extends from one end (that is, the left end or the right end) of the front end assembly 110 by a distance, and then is connected to the rotation mechanism 124. Therefore, setting the rotation mechanism 124 to be away from the torsion mechanism 123 may prevent the corresponding end of the front end assembly 110 from appearing too large in size. The above offers flexibility in the design of the appearance glasses type display device 100. In addition, the length of the rear segment 122 may be greater than the length of the corresponding front segment 121, so that after the pair of legs 120 are folded, the overall thickness of the glasses type display device 100 is not too large.

Referring to FIGS. 1 and 2, in this embodiment, each leg 120 may further include a cushion 125, which is disposed at the corresponding rear segment 122 to contact the user's head and increase the gripping force. The material of the cushion 125 may be foam, rubber, or other elastic materials.

Referring to FIGS. 1 and 2, in this embodiment, the front end assembly 110 may have one or more cameras 112 to extract an external image, and the external image may be applied to virtual reality (VR), augmented reality (AR), or mixed reality (MR) based on needs. In addition, when the number of cameras 112 is more than two, image data extracted by these cameras 112 may be applied to positional tracking, too.

Referring to FIG. 1, in this embodiment, in the case of an in-built display, the front end assembly 110 has a motherboard 114. The motherboard 114 is responsible for the operation of the aforementioned optical system. The torsion mechanism 123 applies torque to the front segment 121 of the leg 120 relative to the front end assembly 110, which keeps the front end assembly 110 itself from being deformed as much as possible, so as to prevent the original function from being affected or the service life from being reduced due to the motherboard 114 being bent. Specifically, since the camera 112 is disposed on the motherboard 114, when the camera 112 is used for position tracking, if the motherboard 114 is slightly deformed, an error in the position data obtained by the camera 112 may be generated. Therefore, the torsion mechanism 123 may reduce the possibility of deformation of the motherboard 114, too.

Figure 8:
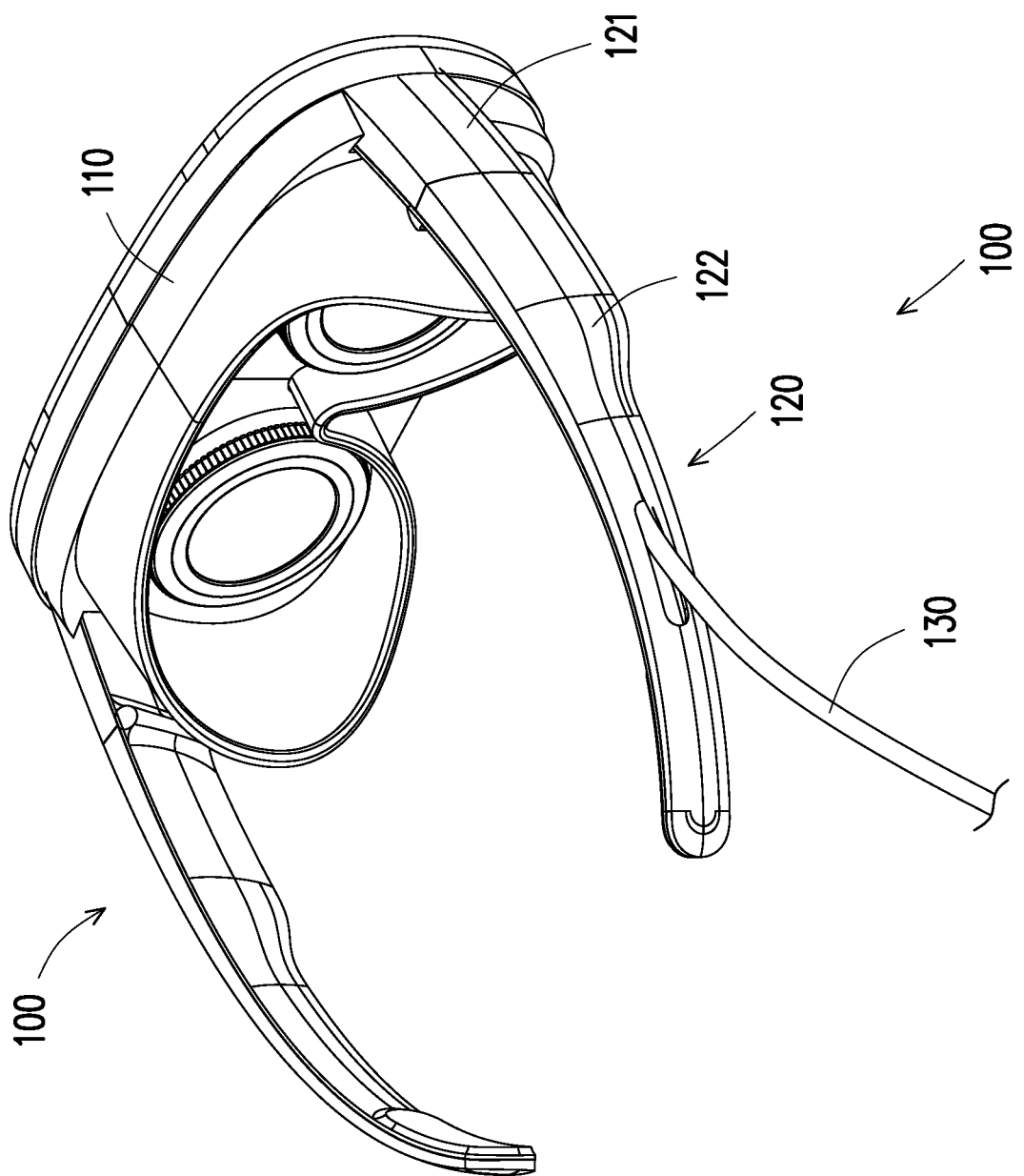
FIG. 8 is a schematic view of a glasses type display device according to another embodiment of the invention.

Referring to FIG. 8, compared with the embodiment in FIG. 1, in this embodiment, the glasses type display device 100 may include a cable 130. The cable 130 extends from the rear segment 122 to connect to an external power source or an external data source. The external power source is, for example, a portable charger or a fixed power source. The external data source is, for example, a mobile phone, a portable computer, or a desktop computer. Therefore, the wiring responsible for signals and power may be distributed inside the leg 120 and the cable 130.

In summary, in the above-mentioned embodiments of this application, via the torsion mechanism disposed between the front end assembly and the front segment, the pair of legs may grip the user's head relative to the front end assembly, so that the front end assembly may be stably positioned on the user's face. In addition, via the rotation mechanism disposed at the front segment and rear segment of the legs, the pair of legs may be folded behind the front end assembly, so that the glasses type display device occupies a small space as a whole.

What is claimed is:

1. A glasses type display device, comprising:
    a front end assembly;
    a pair of legs, wherein each of the pair of legs comprises:
    a front segment;
    a rear segment;
    a torsion mechanism, disposed in the front end assembly and connected between the front end assembly and the front segment; and
    a rotation mechanism, disposed between the front segment and the rear segment,
    wherein the rotation mechanism is a hinge,
    wherein the torsion mechanism is a spring hinge, the spring hinge comprises a spring, the spring is hidden in the front end assembly,
    the front end assembly has at least one camera and a motherboard for extracting an external image, and the at least one camera is disposed on the motherboard,
    wherein the front segment is unfoldable and suitable for slightly rotating outward via the torsion mechanism so as to reduce the possibility of deformation of the motherboard.

2. The glasses type display device according to claim 1, wherein a length of the rear segment is greater than a length of the corresponding front segment.

3. The glasses type display device according to claim 1, wherein a rotation axis of the torsion mechanism and a rotation axis of the rotation mechanism are parallel to each other.

4. The glasses type display device according to claim 1, wherein each of the pair of legs further comprises:
    a cushion, disposed at the rear segment, adapted for contacting a user.

5. The glasses type display device according to claim 1, wherein a number of the at least one camera is one.

6. The glasses type display device according to claim 1, wherein a number of the at least one camera is more than or equal to two.

7. The glasses type display device according to claim 1, further comprising:
    a cable, extending from the rear segment, adapted for connecting to an external power source or an external data source.

* * * * *